US011553376B2

(12) United States Patent
Gupta et al.

(10) Patent No.: US 11,553,376 B2
(45) Date of Patent: Jan. 10, 2023

(54) COMMUNICATION LINK SELECTION FOR NON-RSRP BASED ASSOCIATION IN WIRELESS INDUSTRIAL INTERNET-OF-THINGS

(71) Applicant: QUALCOMM Incorporated, San Diego, CA (US)

(72) Inventors: Piyush Gupta, Bridgewater, NJ (US); Junyi Li, Franklin Park, NJ (US); Hua Wang, Basking Ridge, NJ (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 17/186,780

(22) Filed: Feb. 26, 2021

(65) Prior Publication Data

US 2021/0282054 A1 Sep. 9, 2021

Related U.S. Application Data

(60) Provisional application No. 62/987,137, filed on Mar. 9, 2020.

(51) Int. Cl.
*H04W 28/08* (2009.01)
*H04W 28/02* (2009.01)
(Continued)

(52) U.S. Cl.
CPC ... *H04W 28/0942* (2020.05); *H04W 28/0236* (2013.01); *H04W 40/12* (2013.01); *H04W 84/18* (2013.01); *H04W 92/18* (2013.01)

(58) Field of Classification Search
CPC ......... H04W 28/0236; H04W 28/0942; H04W 40/12; H04W 40/22; H04W 48/20;
(Continued)

(56) References Cited

U.S. PATENT DOCUMENTS

2016/0196730 A1* 7/2016 Pandey ................. G08B 17/06
340/650
2016/0295627 A1* 10/2016 Karout .................. H04W 76/14
(Continued)

FOREIGN PATENT DOCUMENTS

WO WO-2020219670 A1 * 10/2020 ........... H04B 7/2606

OTHER PUBLICATIONS

International Search Report and Written Opinion—PCT/US2021/020295—ISA/EPO—dated Jun. 10, 2021.
(Continued)

*Primary Examiner* — Nathan S Taylor
(74) *Attorney, Agent, or Firm* — Harrity & Harrity, LLP

(57) ABSTRACT

Various aspects of the present disclosure generally relate to wireless communication. In some aspects, a network node may receive an indication of a first set of parameters that corresponds to a direct communication link between an industrial internet-of-things (IIoT) device and a first controller; receive an indication of a second set of parameters that corresponds to an indirect communication link between the IIoT device and the first controller through a second controller; and schedule a communication on at least one of the direct communication link or the indirect communication link based at least in part on the first set of parameters and the second set of parameters. Numerous other aspects are provided.

30 Claims, 11 Drawing Sheets

(51) Int. Cl.
*H04W 40/12* (2009.01)
*H04W 84/18* (2009.01)
*H04W 92/18* (2009.01)

(58) Field of Classification Search
CPC ....... H04W 76/23; H04W 8/04; H04W 84/18; H04W 92/18; H04W 28/02; H04W 28/08
See application file for complete search history.

(56) References Cited

U.S. PATENT DOCUMENTS

| | | | | |
|---|---|---|---|---|
| 2017/0127301 | A1* | 5/2017 | Sharma | H01B 7/0876 |
| 2019/0319868 | A1* | 10/2019 | Svennebring | H04L 41/147 |
| 2019/0349980 | A1* | 11/2019 | Li | H04W 72/1289 |
| 2020/0146048 | A1* | 5/2020 | Lee | H04W 72/12 |
| 2020/0259896 | A1* | 8/2020 | Sachs | G06K 19/06037 |
| 2020/0374263 | A1* | 11/2020 | Majmundar | H04W 8/082 |
| 2021/0105789 | A1* | 4/2021 | Freda | H04W 4/40 |
| 2021/0184795 | A1* | 6/2021 | Ibars Casas | H04L 1/0061 |
| 2021/0321339 | A1* | 10/2021 | Lee | H04W 52/286 |
| 2022/0070826 | A1* | 3/2022 | Xu | H04W 72/02 |
| 2022/0086935 | A1* | 3/2022 | Byun | H04W 72/04 |
| 2022/0104178 | A1* | 3/2022 | Lee | H04W 72/02 |
| 2022/0131729 | A1* | 4/2022 | You | H04L 27/2607 |
| 2022/0141074 | A1* | 5/2022 | You | H04L 27/2666 |
| | | | | 375/262 |
| 2022/0201482 | A1* | 6/2022 | Ferdi | H04W 60/00 |

OTHER PUBLICATIONS

Nokia, et al., "Path Switch Between Direct and Indirect Communications", 3GPP Draft, 3GPP TSG-RAN WG2 Meeting #98, R2-1704328_D2D_Path_Switch_Procedure, 3rd Generation Partnership Project (3GPP), Mobile Competence Centre, 650, Route Des Lucioles, F-06921 Sophia-Antipolis Cedex, France, vol. RAN WG2. No. Hangzhou, China, May 15, 2017-May 19, 2017 May 14, 2017 (May 14, 2017), XP051274903, 4 Pages, Retrieved from the Internet: URL:http://www.3gpp.org/ftp/Meetings_3GPP_SYNC/RAN2/Docs/ [retrieved on May 14, 2017] the whole document.

* cited by examiner

COMMUNICATION LINK SELECTION FOR NON-RSRP BASED ASSOCIATION IN WIRELESS INDUSTRIAL INTERNET-OF-THINGS

CROSS-REFERENCE TO RELATED APPLICATION

This patent application claims priority to U.S. Provisional Patent Application No. 62/987,137, filed on Mar. 9, 2020, entitled "COMMUNICATION LINK SELECTION FOR NON-RSRP BASED ASSOCIATION IN WIRELESS INDUSTRIAL INTERNET-OF-THINGS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for communication link selection for non-reference signal received power (RSRP) based association in wireless industrial internet-of-things.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a network node for wireless communication includes a memory and one or more processors operatively coupled to the memory, the memory and the one or more processors configured to: receive an indication of a first set of parameters that corresponds to a direct communication link between an industrial internet-of-things (IIoT) device and a first controller; receive an indication of a second set of parameters that corresponds to an indirect communication link between the IIoT device and the first controller through a second controller; and schedule a communication on at least one of the direct communication link or the indirect communication link based at least in part on the first set of parameters and the second set of parameters.

In some aspects, a method of wireless communication performed by a network node includes receiving an indication of a first set of parameters that corresponds to a direct communication link between an IIoT device and a first controller; receiving an indication of a second set of parameters that corresponds to an indirect communication link between the IIoT device and the first controller through a second controller; and scheduling a communication on at least one of the direct communication link or the indirect communication link based at least in part on the first set of parameters and the second set of parameters.

In some aspects, a non-transitory computer-readable medium storing a set of instructions for wireless communication includes one or more instructions that, when executed by one or more processors of a network node, cause the network node to: receive an indication of a first set of parameters that corresponds to a direct communication link between an IIoT device and a first controller; receive an indication of a second set of parameters that corresponds to an indirect communication link between the IIoT device and the first controller through a second controller; and schedule a communication on at least one of the direct communication link or the indirect communication link based at least in part on the first set of parameters and the second set of parameters.

In some aspects, an apparatus for wireless communication includes means for receiving an indication of a first set of parameters that corresponds to a direct communication link between an IIoT device and a first controller; means for receiving an indication of a second set of parameters that corresponds to an indirect communication link between the IIoT device and the first controller through a second controller; and means for scheduling a communication on at least one of the direct communication link or the indirect communication link based at least in part on the first set of parameters and the second set of parameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
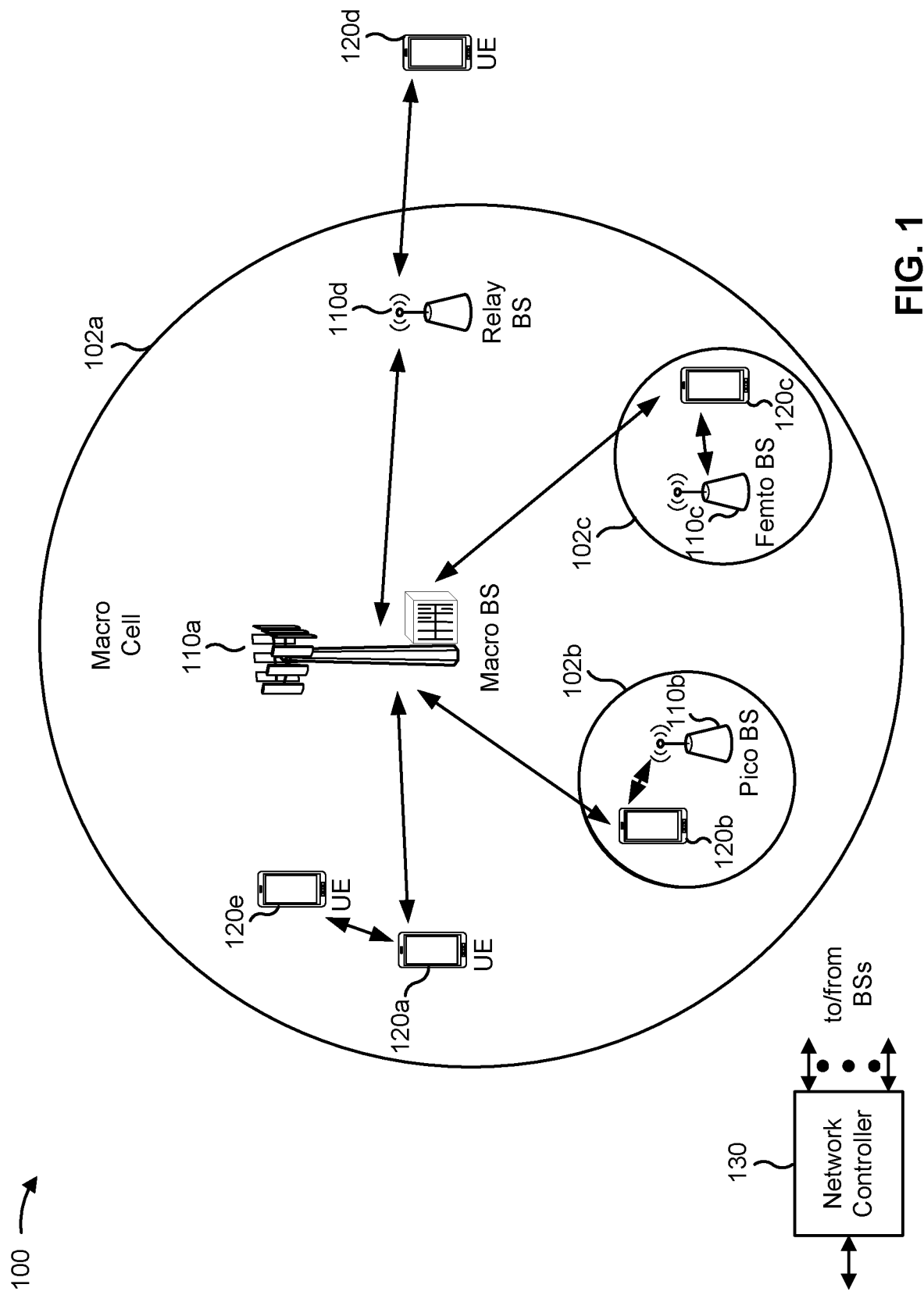
FIG. 1 is a diagram illustrating an example of a wireless network, in accordance with various aspects of the present disclosure.

FIG. 1 is a diagram illustrating an example of a wireless network 100 in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, such as macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
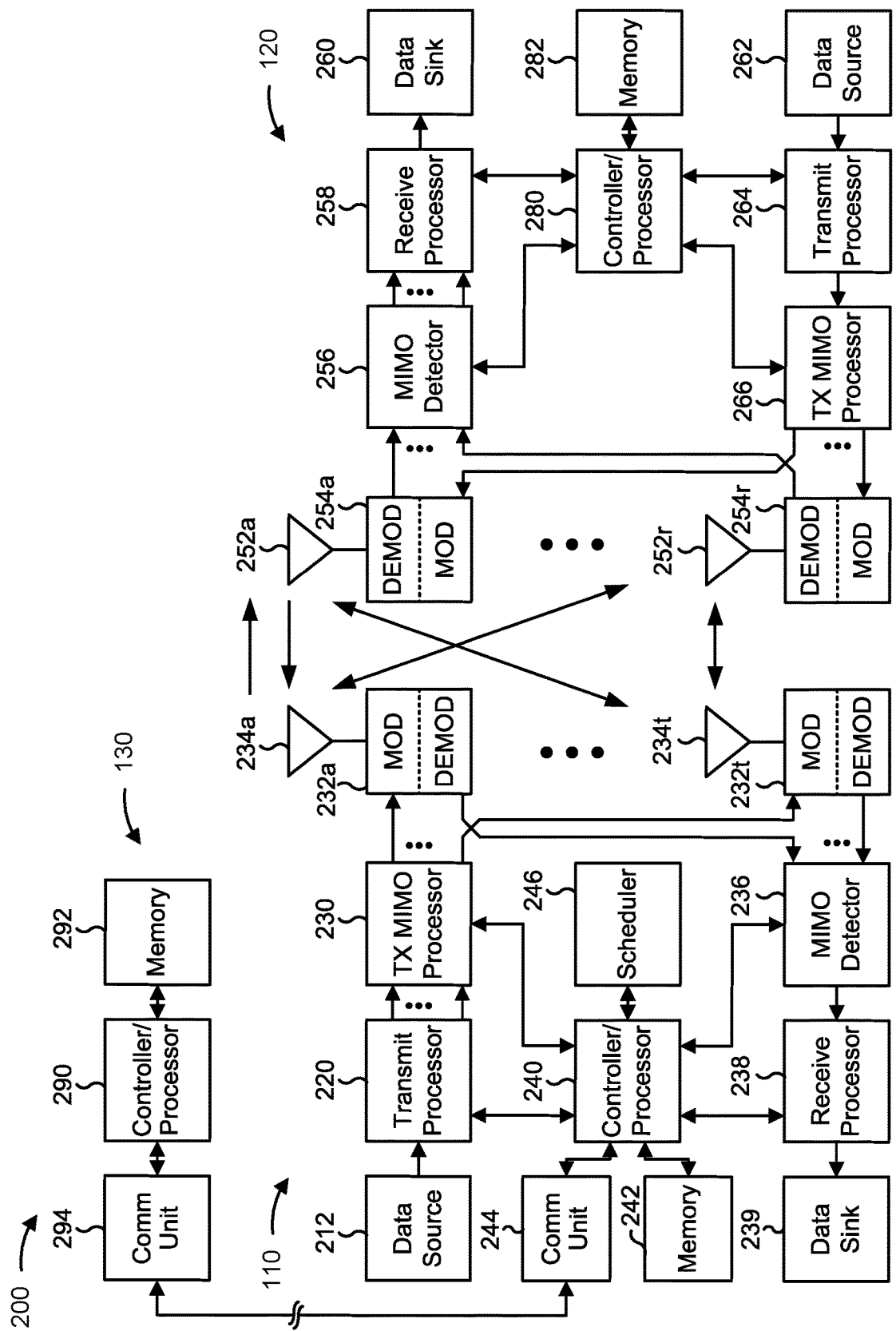
FIG. 2 is a diagram illustrating an example of a base station in communication with a UE in a wireless network, in accordance with various aspects of the present disclosure.

FIG. 2 shows a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the network node, and provide data symbols for all network nodes. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) and/or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP) parameter, a received signal strength indicator (RSSI) parameter, a reference signal received quality (RSRQ), a channel quality indicator (CQI), and/or the like. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 9-11.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 9-11.

Controller/processor 240 of base station 110, controller/processor 280 of UE 120, and/or any other component(s) of FIG. 2 may perform one or more techniques associated with communication link selection for non-reference signal received power (RSRP) based association in wireless industrial internet-of-things (IIoT), as described in more detail elsewhere herein. For example, controller/processor 240 of base station 110, controller/processor 280 of UE 120, another UE, and/or any other component(s) of FIG. 2 may perform or direct operations of, for example, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1100 of FIG. 11, and/or other processes as described herein. In some aspects, executing instructions may include running the instructions, converting the instructions, compiling the instructions, interpreting the instructions, and/or the like.

In some aspects, network node 120 may include means for receiving an indication of a first set of parameters that corresponds to a direct communication link between an IIoT device and a first controller, means for receiving an indication of a second set of parameters that corresponds to an indirect communication link between the IIoT device and the first controller through a second controller, means for scheduling a communication on at least one of the direct communication link or the indirect communication link based at least in part on the first set of parameters and the second set of parameters, and/or the like. In some aspects, such means may include one or more components of network node 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
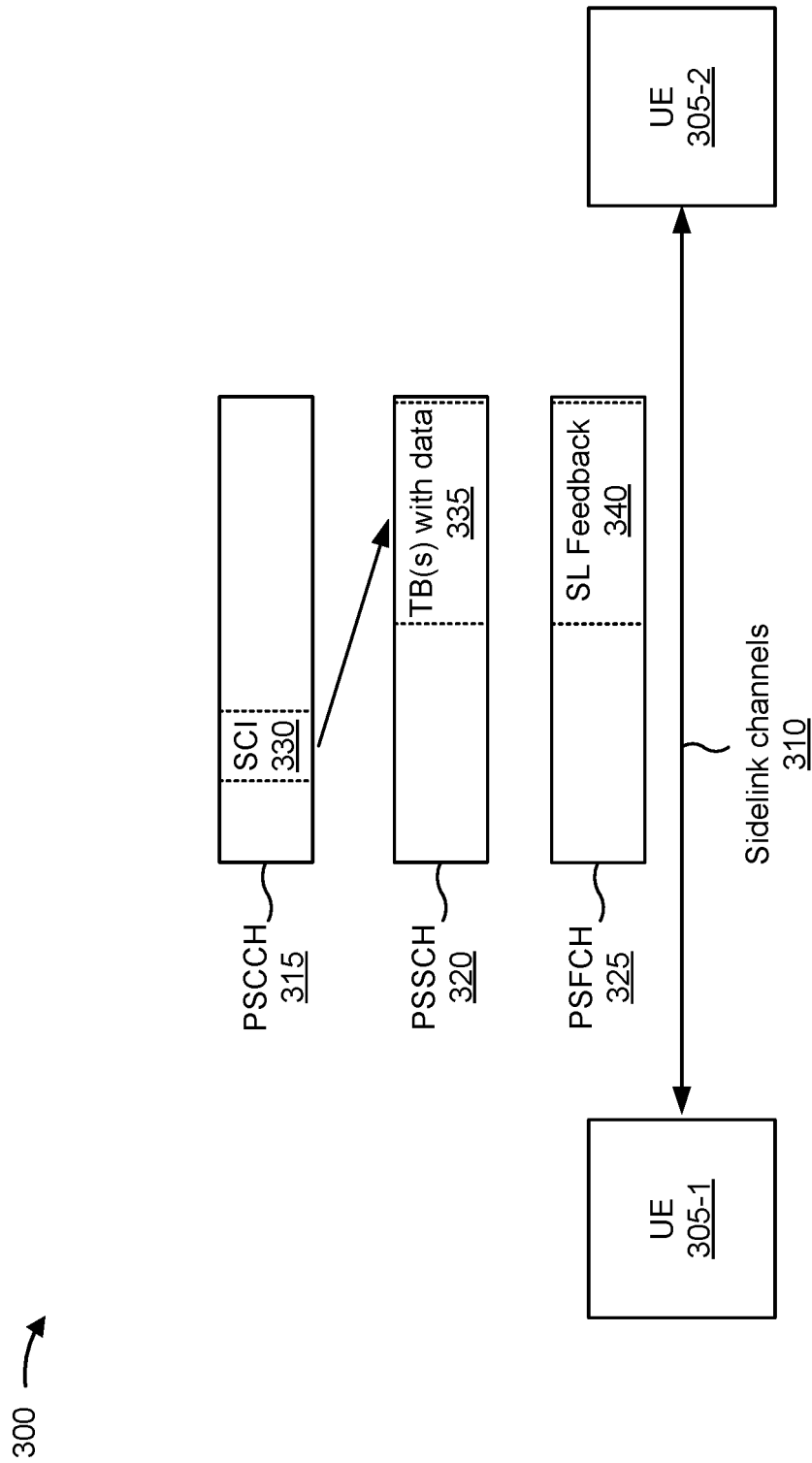
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
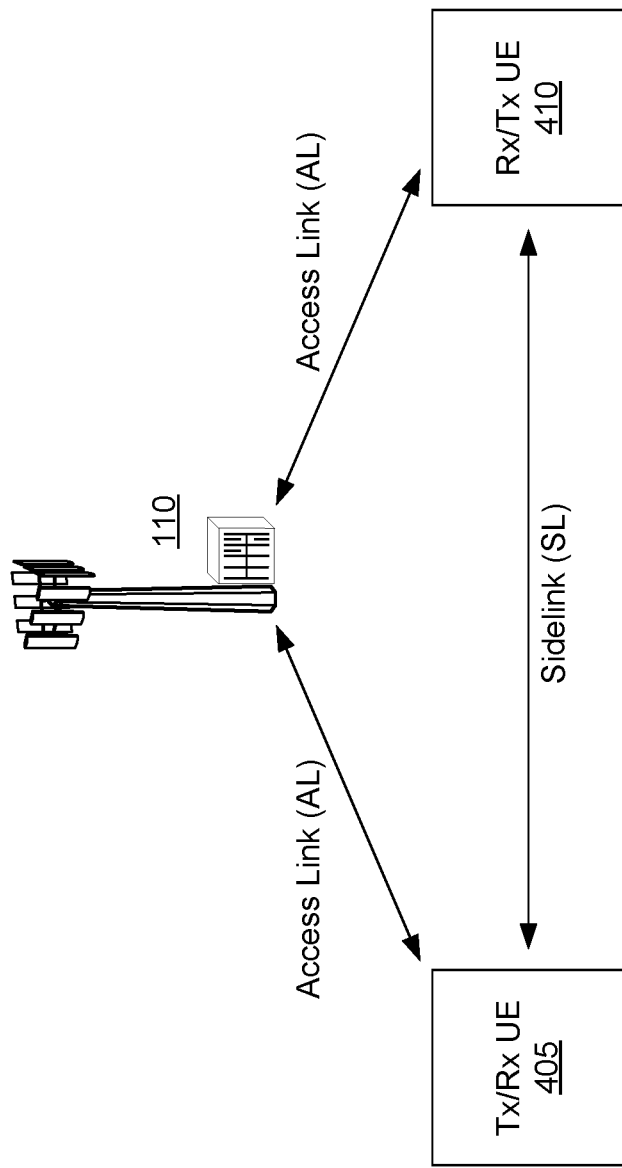
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, "sidelink" may refer to a direct link between UEs 120, and "access link" may refer to a direct link between a base station 110 and a UE 120. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

IIoT is a branch of cellular technology in which UEs and BSs may be used to carry control data, measurement data, and/or the like between various industrial systems. For example, IIoT may be used to control IIoT devices such as sensors and/or actuators, to exchange measurement information between other IIoT devices such as programmable logic controllers (PLCs) of a factory floor (for example, in a factory automation application), and/or the like. According to various aspects, IIoT devices discussed herein (e.g., sensors, actuators, PLCs, and/or the like) may be, include, or be included in, UEs such as UE 120 discussed above in connection with FIG. 1. In some aspects, an IIoT device may function as a small cell (e.g., a pico cell), in which case the IIoT device may be, include, or be included in, a BS such as BS 110 discussed above in connection with FIG. 1.

Figure 5:
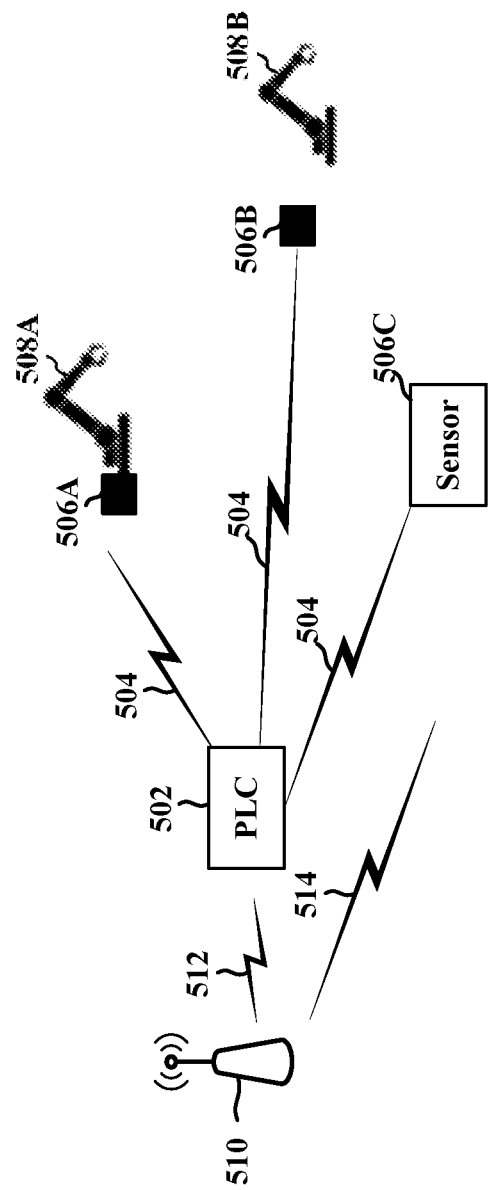
FIG. 5 is a diagram illustrating an example of an industrial internet-of-things (IIoT) communications network, in accordance with various aspects of the present disclosure.

FIG. 5 is a diagram illustrating an example of an IIoT communications network 500, in accordance with various aspects of the present disclosure.

As shown, the network 500 includes a PLC 502 (which is, itself, a type of IIoT device) that exchanges wireless communication 504 with IIoT devices 506 (shown as 506A, 506B, and 506C). The IIoT devices 506 may include sensors 506C, actuators 506A and 506B, and/or the like. In some aspects, the IIoT devices 506 may be associated with equipment 508 (shown as 508A and 508B). The network 500 may include a base station 510 that exchanges communication 512 with the PLC 502 and/or communication 514 with one or more of the other IIoT devices 506.

The communication between the PLC 502 and IIoT devices 506 may include cyclic exchanges of information. The PLC 502 may provide commands in wireless signals to factory equipment 508. Sensors 506C and actuators 506A, 506B may be separate from the factory equipment 508 and/or may be comprised in or positioned at a piece of factory equipment 508. The PLC 502 may automate control of machines and control systems, e.g., of industrial electromechanical processes, such as control of machinery on factory assembly lines, amusement rides, light fixtures, etc. An IIoT network 500 may include any number of PLCs 502, sensors 506C, actuators 506A, 506B, and/or the like.

As indicated above, FIG. 5 is provided as an example. Other examples may differ from what is described with respect to FIG. 5.

Figure 6:
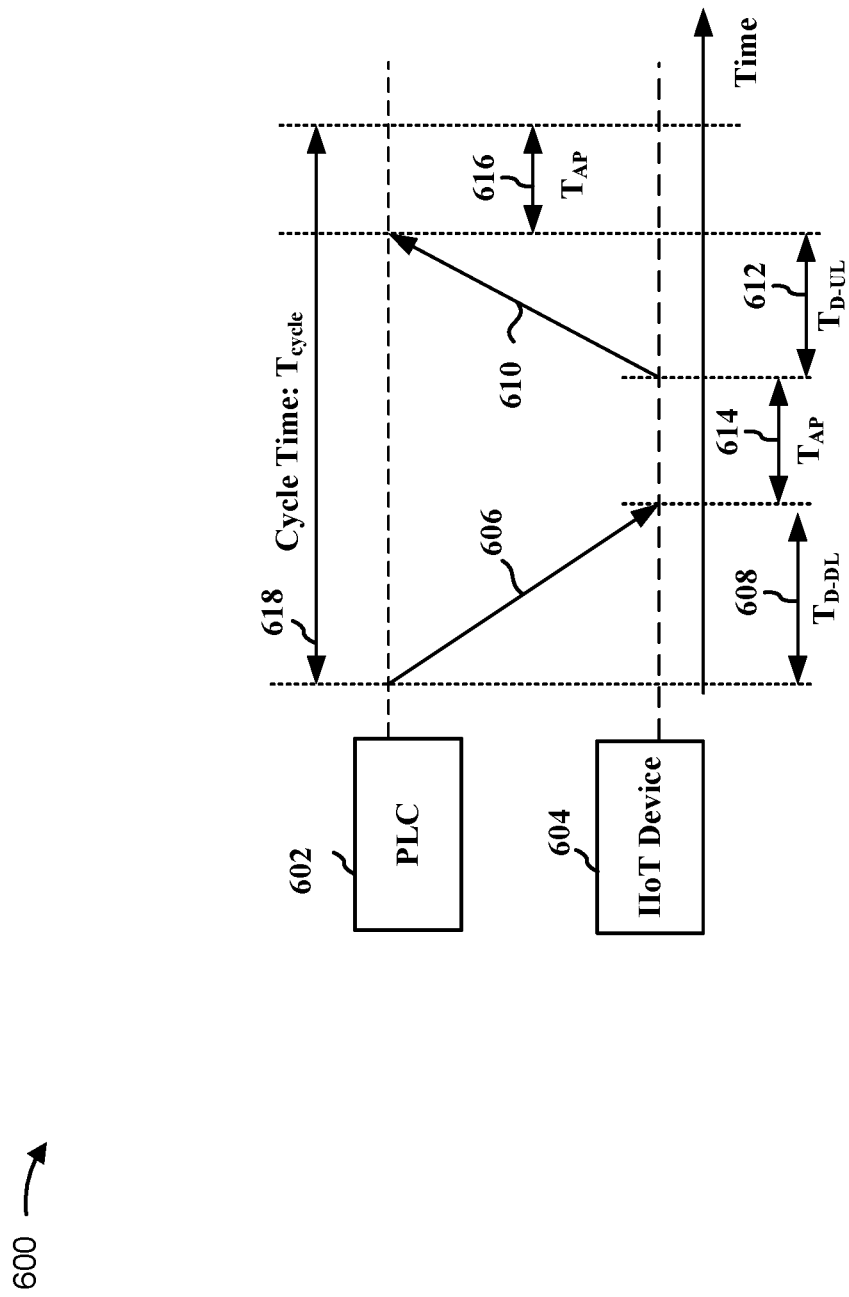
FIGS. 6 and 7 are diagrams illustrating examples of IIoT communications, in accordance with various aspects of the present disclosure.

FIG. 6 is a diagram illustrating an example 600 of IIoT communications, in accordance with various aspects of the present disclosure.

As shown, a PLC 602 and an IIoT device 604 may exchange periodic or cyclic traffic. The PLC 602 may transmit communication 606 such as a command or other communication to the IIoT device 604 during a period of time $T_{D\text{-}DL}$, 608. The communication 608 from the PLC 602 to the IIoT device 604 may be referred to as downlink communication. The IIoT device 604 may receive the communication 608, and may take an action based on the command. Following the action, the IIoT device 604 may transmit communication 610 back to the PLC 602 during period of time $T_{D\text{-}UL}$, 612. There may be a processing time duration 614 ($T_{AP}$) between receipt of the communication 606 from the PLC 602 and transmission of the communication 610 from the IIoT device 604. During the processing time, the IIoT device 604 may be sensing, actuating, and/or the like.

In some aspects, the communication 610 may include sensed data from a sensor, a confirmation of actuation from an actuator, and/or the like. The communication 610 may include an application layer acknowledgement. The communication 610 that is transmitted from the IIoT device 604 to the PLC 602 may be referred to as uplink communication. Following the PLC's receipt of the communication 610 from the IIoT device 604, there may be a processing duration 616 ($T_{AP}$) during which the PLC 602 may process the received information and before the PLC 602 sends additional communication/commands to the IIoT device 604. The combined cycle may have a duration 618 of length $T_{cycle}$. Following the duration 616 $T_{AP}$, the cycle may repeat with the PLC 602 sending additional communication 606 to the IIoT device 604.

The communication network may accommodate periodic, regular traffic between PLCs 602 and IIoT devices 604. The communication between the PLC 602 and the IIoT device 604 may be associated with a low latency and high reliability. For example, the communication may be based on a latency of less than 2 ms or less than 1 ms. The communication may have a reliability requirement on the order of $10^{-5}$ or $10^{-6}$, such as 99.9999% reliability. The latency and reliability may apply to data and control channels.

In some aspects, a PLC 602 may use a control channel, such as a physical downlink control channel (PDCCH), to grant resources to IIoT device 604 for use in transmitting the periodic uplink communication 610. Factory automation may involve a high IIoT device 604 density (e.g., approximately 1 UE per m$^2$). Therefore, a large number of IIoT devices 604 may communicate with the PLC 602. Sending a dynamic grant (e.g., one downlink control information (DCI) per slot) to each of the large number of IIoT devices 604 may place a burden on PDCCH overhead. Semi-persistent scheduling (SPS) may be used to reduce the overhead requirements of PDCCH by enabling the IIoT devices 604 to be granted resources in a semi-persistent or periodic manner.

SPS may also be used to schedule resources for receiving downlink communication. The SPS may be communicated to each IIoT device 604 using radio resource control (RRC) signaling and/or DCI. In some aspects, SPS may be used for a first transmission, and PDCCH may be used to schedule a possible retransmission if the first transmission is not accurately received.

As indicated above, FIG. 6 is provided as an example. Other examples may differ from what is described with respect to FIG. 6.

Figure 7:
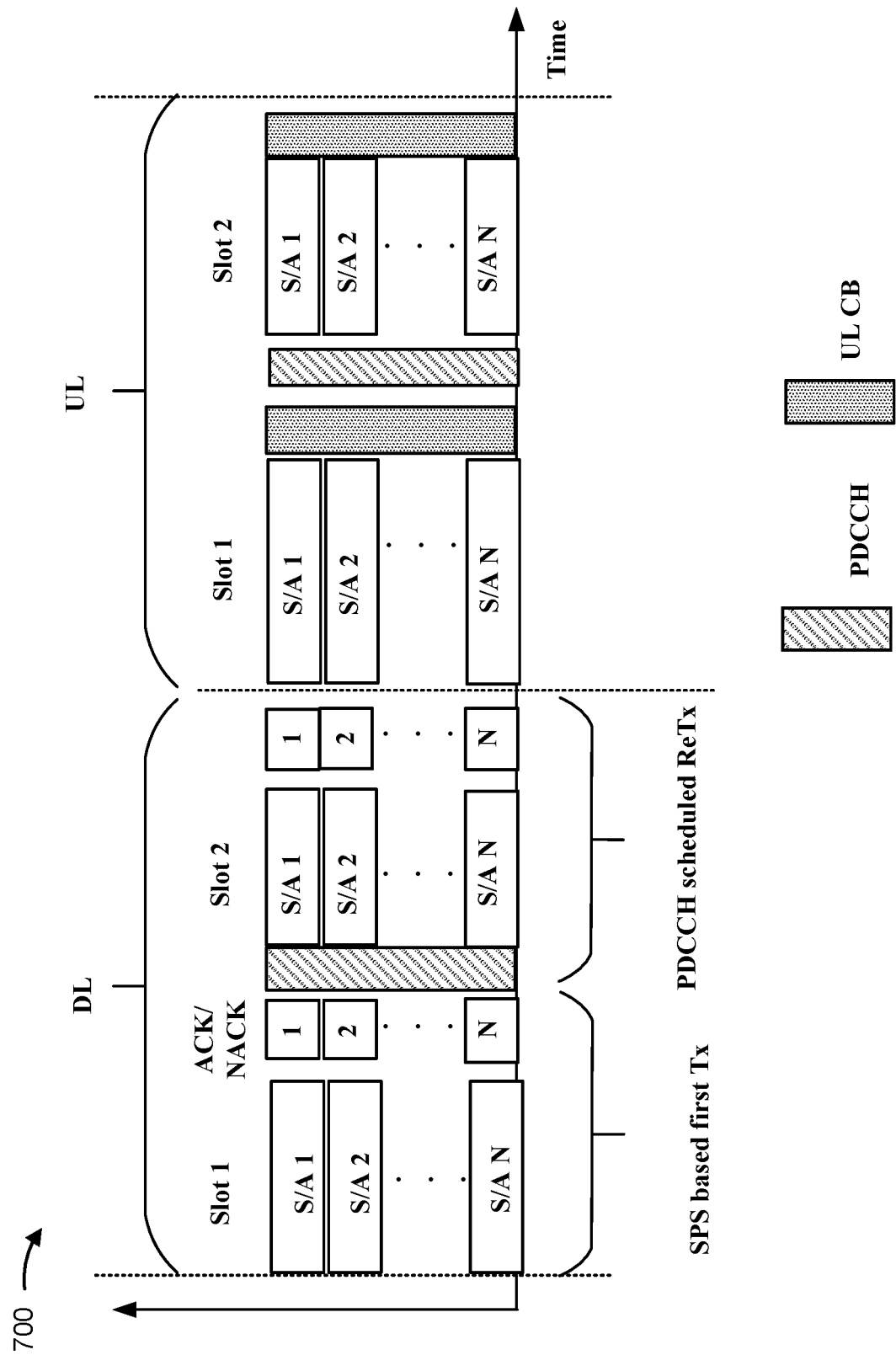

FIG. 7 is a diagram illustrating an example 700 of IIoT communications, in accordance with various aspects of the present disclosure. As shown in FIG. 7, IIoT communications may include downlink transmissions from a PLC to a sensor and/or actuator 1 (shown as "S/A 1"), a sensor and/or actuator 2 (shown as "S/A 2"), and so forth until the downlink transmission for a sensor and/or actuator N (shown as "S/A N") in a slot 1 based on SPS. Acknowledgement/negative acknowledgement (ACK/NACK) feedback may be received from each of the sensors/actuators. Based on the feedback, the PLC may transmit PDCCH to schedule resources for a retransmission of the information to the sensors/actuators from which a NACK is received or from which an ACK is not received. For uplink communication, the PLC may receive uplink transmissions from sensor/actuator 1 (S/A 1), sensor/actuator 2 (S/A 2), . . . , sensor/actuator N (S/A N) in a slot 1 based on SPS. The PLC may provide ACK/NACK feedback to each of the sensor/actuators. The PLC may transmit PDCCH to the sensors/actuators scheduling a retransmission for information that was not correctly received by the PLC.

As indicated above, FIG. 7 is provided as an example. Other examples may differ from what is described with respect to FIG. 7.

Figure 8:
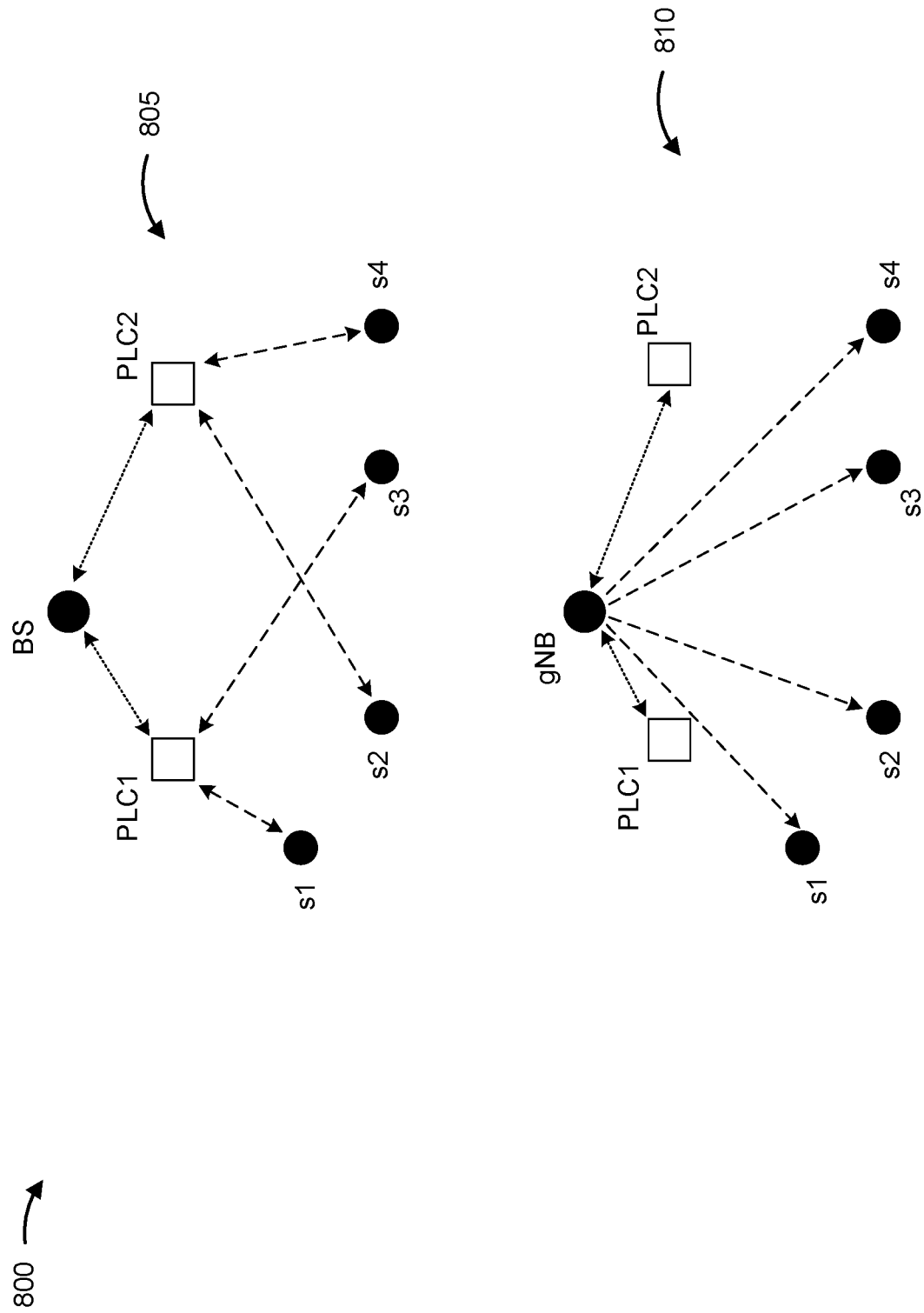
FIG. 8 is a diagram illustrating examples of IIoT communications, in accordance with various aspects of the present disclosure.

FIG. 8 is a diagram illustrating examples 800 of IIoT communications, in accordance with various aspects of the present disclosure.

As shown by reference number 805, a first PLC (shown as "PLC 1") may be configured to communicate with a first IIoT device (shown as "s1") and a second IIoT device (shown as "s3"). The PLC 1 may be associated with s1 and s3, which means the PLC 1 may control s1 and/or s3, be configured to receive and/or process data from s1 and/or s3, and/or the like. In some aspects, the association between the PLC 1 and s1 and s3 may be established by an industrial application that controls factory operations at the application layer. Similarly, as shown, a second PLC (shown as "PLC 2") may be associated with a third IIoT device (shown as "s2") and a fourth IIoT device (shown as "s4"). In some aspects, the association between the PLC 2 and s2 and s4 may be established by the industrial application. The communication links between the PLCs and the IIoT devices may be based on a PC5 interface, which may be used to implement sidelink communication.

A base station (BS) (e.g., a gNB, and/or the like) may communicate with PLC 1 and/or PLC 2. In some aspects, PLCs 1 and 2 may be located close to machinery, whereas the BS may be ceiling mounted or at a greater distance from the equipment. The communication links between the BS and the PLCs may be based on an uplink/downlink (Uu) interface, which also may be referred to as an access link. In some aspects, a PLC may function as a small cell and one or more IIoT devices may communicate with the PLC based on an Uu interface (access link).

In some aspects, one or more of the PLCs may use the BS for inter-PLC coordination with other PLCs. Additionally, or alternatively, the PLCs may communicate over direct communication links with one another. Direct communication between PLC 1 and PLC 2 may be based on sidelink communications, which may utilize, in some aspects, the PC5 interface. In some aspects, one or more of the PLCs may use the BS for a backhaul to a human machine interface (HMI). In some aspects, one or more of the PLCs may use the BS as a system controller. The BS may perform interference management (IM) across multiple PLCs. The BS may handle other network functions for the IIoT devices, such as initial access with the network, mobility, and/or the like.

As indicated above, an application may determine association between a PLC and an IIoT device. In some aspects, this association may be determined based on industrial functions and processes, and not based on communication link quality such as RSRP between the PLC and its associated IIoT device. As shown, for example, PLC 1 may be associated with s3, even though it is farther away from s3 than PLC 2. Similarly, PLC 2 may be associated with s2, even though it is farther away from s2 than PLC 1. The direct communication link between PLC 1 and s3 and the direct communication link between PLC 2 and s2 may be weak, subject to cross-link interference, and/or the like.

As shown by reference number 810, to mitigate some of the issues regarding the direct communication links between PLCs and associated IIoTs, the BS may communicate with one or more of the IIoT devices s1, s2, s3, and/or s4. The links between the BS and the IIoT devices may be based on a Uu interface. The transmission of control by the BS may help to improve reliability. Such control by the BS may involve two hops in order to provide the control to the IIoT—a first hop from a PLC to the base station and a second hop from the base station to the associated IIoT device. In some examples, a portion of scheduling for the IIoT devices may be provided by the BS, and another portion of the scheduling may be provided by the PLC 1 and/or PLC 2. Providing some control directly from the PLC may help to reduce over-the-air signaling and may improve latency. However, transmissions from the PLC may be blocked for a particular IIoT device. Blocks of links between PLCs and various IIoTs may last for different amounts of time. Moreover, using the BS for two-hop communications may be inefficient as more latency may be introduced.

Various aspects of the techniques and apparatus disclosed herein may enable communication link selection between direct communication links and two-hop communication links for non-RSRP based association in wireless IIoT environments. The two-hop communication links may include a first hop between an IIoT device and a first controller and a second hop between the first controller and a second controller. In this manner, two-hop communications may be utilized without utilizing the BS. In some aspects, the direct or indirect communication link with characteristics that satisfy one or more thresholds may be selected. The characteristics may be evaluated using parameters that relate to reliability, latency, signal quality, and/or the like.

In some aspects, a network node (e.g., a PLC, an IIoT device, and/or the like) may act as a scheduling device and may receive an indication of parameters that correspond to direct communication link between an IIoT device and a first controller (e.g., a PLC and/or the like) and an indication of parameters that correspond to an indirect communication link between the IIoT device and the first controller, where the indirect communication link involves a second controller. The scheduling device may schedule communication on the direct and/or indirect communication link based at least in part on the parameters. In this way, aspects of the techniques disclosed herein may enable improved network capacity with load balancing across PLCs based on a two-hop metric that corresponds to the parameters. In some aspects, techniques described herein may facilitate multi-path diversity, in which a transmission and its retransmission are forwarded over different communication links. In some aspects, utilizing controllers for multiple hop communications may reduce the need for BS capacity.

As indicated above, FIG. 8 is provided as an example. Other examples may differ from what is described with respect to FIG. 8.

Figure 9:
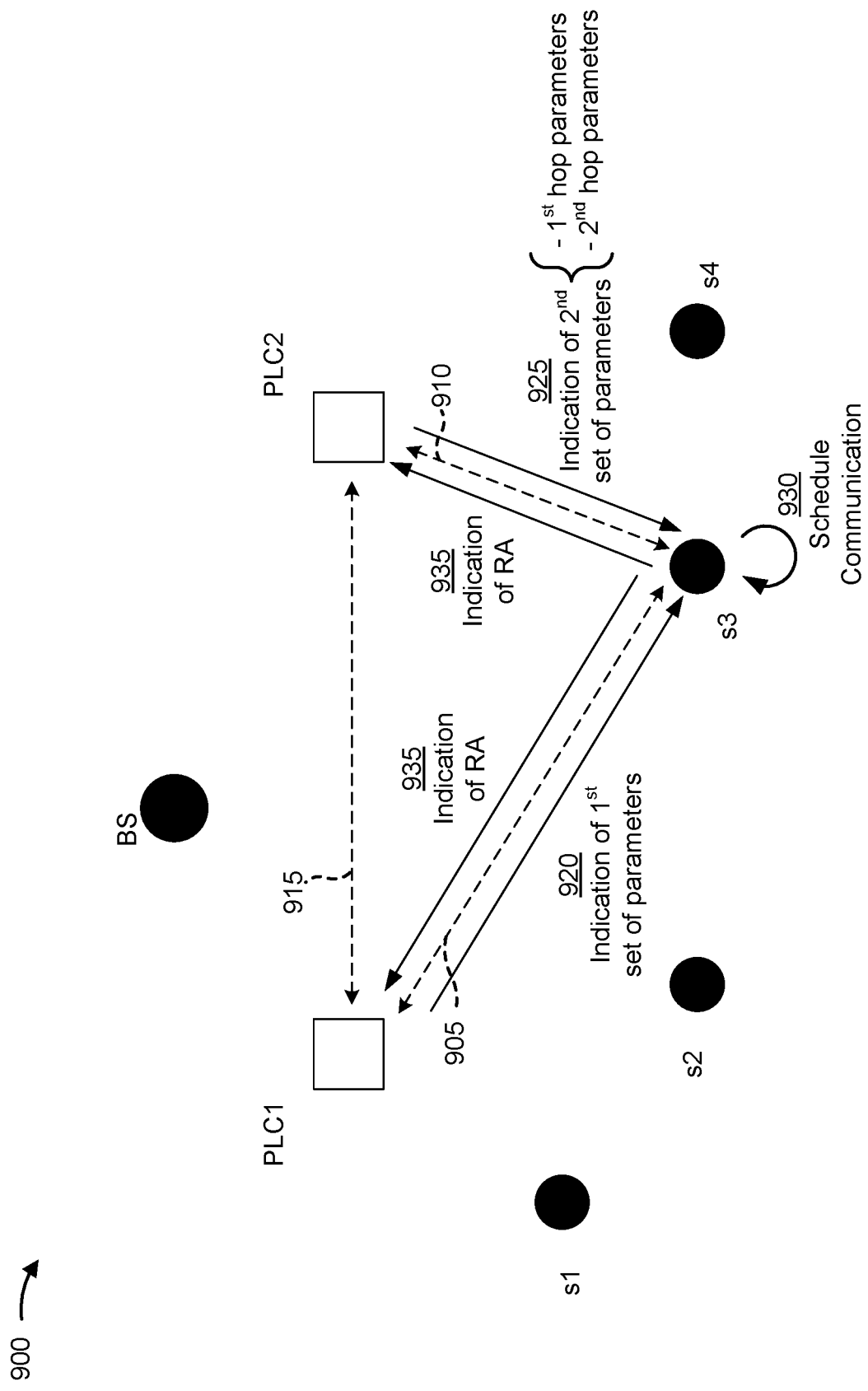
FIGS. 9 and 10 are diagrams illustrating examples of communication link selection for non-reference signal received power (RSRP) based association in wireless IIoT, in accordance with various aspects of the present disclosure.

FIG. 9 is a diagram illustrating an example 900 of communication link selection for non-RSRP based association in wireless industrial internet-of-things, in accordance with various aspects of the present disclosure.

As shown in FIG. 9, the IIoT device s3 may be the scheduling network node, in which case, a direct communication link 905 between s3 and PLC 1 and/or a direct communication link 910 between s3 and PLC 2, may be based on Mode 2 sidelink. Similarly, a direct communication link 915 between PLC 1 and PLC 2 may be based on Mode 2 sidelink. In some aspects, as discussed below in connection with FIG. 10, the scheduling network node may be the BS for Uu (access link) based communications, Mode 1 sidelink communications, and/or the like. In some aspects, the scheduling network node may include the PLC 1 and/or PLC 2 for small cell Uu communications, Mode 2 sidelink communications with UE-UE scheduling, Mode 1 sidelink communications, and/or the like.

As shown by reference number 920, the network node s3 may receive an indication of a first set of parameters that corresponds to a direct communication link 905 between an IIoT device and a first controller (shown as PLC 1). In the illustrated aspects, in which the scheduling network node includes the IIoT device, at least a portion of the indication of the first set of parameters may be received by the IIoT device s3 itself (e.g., by determining one or more of the first set of parameters, and/or the like). As shown, in some aspects, at least a portion of the indication of the first set of parameters may be received from the first controller PLC 1.

In some aspects, the first set of parameters may indicate a communication link quality associated with the direct communication link between the IIoT device s3 and the first controller PLC 1, a load associated with the first controller PLC 1, a resource requirement associated with the direct communication link 905 between the IIoT device s3 and the first controller PLC 1, and/or the like. In some aspects, receiving the indication of the first set of parameters may include receiving a unicast message from the first controller PLC 1, receiving a multicast message from the first controller PLC 1, receiving a broadcast message from the first controller PLC 1, and/or the like.

In some aspects, for example, the IIoT device s3 may receive a parameter indicating the link quality associated with the direct communication link 905 by determining the link quality. In some aspects, the IIoT device s3 may determine the link quality based on a reference signal received from the first controller PLC 1. The link quality may include any number of different measurements of communication quality such as, for example, a reference signal received power (RSRP), a reference signal received quality (RSRQ), a signal noise ratio (SNR), a signal to interference and noise ration (SINR), and/or the like.

In some aspects, the first controller PLC 1 may transmit an indication of a parameter indicating the load associated with the PLC 1. "Load" may refer to a communication and/or processing load associated with communicating with one or more devices. The one or more devices may include the IIoT device s3, another IIoT device (s1, s2, s4, and/or the like), another controller (e.g., PLC 2, and/or the like), and/or the like. In some aspects, an indication of a parameter indicating resource requirements associated with the communication link 905 may be received from the first controller PLC 1 and/or the IIoT device s3.

As shown by reference number 925, the scheduling network node s3 may receive an indication of a second set of parameters that corresponds to an indirect communication link between the IIoT device s3 and the first controller PLC 1 through a second controller PLC 2. The indication of the second set of parameters may be received from the first controller PLC 1 and/or the second controller PLC 2. In some aspects, as shown in FIG. 9, the second set of parameters may include at least one of a set of first hop parameters corresponding to the direct communication link 910 between the IIoT device s3 and the second controller PLC 2, or a set of second hop parameters corresponding to the direct communication link 915 between the second controller PLC 2 and the first controller PLC 1.

In some aspects, the second set of parameters may indicate a link quality associated with the direct communication link 910 between the IIoT device s3 and the second controller PLC 2, a load associated with the second controller PLC 2, a resource requirement associated with the direct communication link 910 between the IIoT device s3 and the second controller PLC 2, a link quality associated with the direct communication link 915 between the second controller PLC 2 and the first controller PLC 1, a load associated with the first controller PLC 1, a resource requirement associated with the direct communication link 915 between the second controller PLC 2 and the first controller PLC 1, and/or the like.

In some aspects, receiving the indication of the second set of parameters may include receiving a unicast message from the first controller PLC 1, receiving a unicast message from the second controller PLC 2, receiving a multicast message from the first controller PLC 1, receiving a multicast message from the second controller PLC 2, receiving a broadcast message from the first controller PLC 1, receiving a broadcast message from the second controller PLC 2, or a combination thereof. In some aspects, the scheduling network node may be configured to periodically receive indications of at least one of the first set of parameters, the second set of parameters, or a combination thereof.

As shown by reference number 930, the scheduling network node s3, may schedule a communication on at least one of the direct communication link 905 between the IIoT device s3 and the first controller PLC 1 or on the indirect communication link based at least in part on the first set of parameters and the second set of parameters. In some aspects, scheduling the communication may include determining a direct communication link metric based on the first set of parameters; determining an indirect communication link metric based on the second set of parameters; comparing the direct communication link metric with the indirect communication link metric; and selecting at least one of the direct communication link or the indirect communication link based at least in part on comparing the direct communication link metric with the indirect communication link metric.

In some aspects, the direct communication link metric indicates an estimated latency associated with the direct communication link 905 between the IIoT device s3 and the first controller PLC 1, an estimated reliability associated with the direct communication link between the IIoT device s3 and the first controller PLC 1, and/or the like. In some aspects, the indirect communication link metric may indicate an estimated latency associated with the direct communication link 910 between the IIoT device s3 and the second controller PLC 2, an estimated reliability associated with the direct communication link 910 between the IIoT device s3 and the second controller PLC 2, an estimated latency associated with a direct communication link 915 between the second controller PLC 2 and the first controller PLC 1, an estimated reliability associated with the direct communication link 915 between the second controller PLC 2 and the first controller PLC 1, and/or the like.

In some aspects, scheduling the communication on at least one of the direct communication link or the indirect communication link may include scheduling a primary transmission between the IIoT device s3 and the first controller PLC 1 and scheduling a retransmission between the IIoT device s3 and the first controller PLC 1. In some aspects, scheduling the communication may include scheduling the primary transmission between the IIoT device s3 and the first controller PLC 1 by allocating a first set of resources corresponding to the direct communication link or the indirect communication link and scheduling the retransmission between the IIoT device s3 and the first controller PLC 1 by allocating a second set of resources corresponding to the direct communication link or the indirect communication link.

In some aspects, scheduling the communication on at least one of the direct communication link or the indirect communication link may include allocating a set of resources corresponding to the direct communication link, the indirect communication link, or a combination thereof. In some aspects, the set of resources may include time resources, frequency resources, spatial resources, and/or the like. The set of resources may be associated with a semi-persistent scheduling (SPS) communication, a periodic scheduling communication, an aperiodic scheduling communication, and/or the like.

In some aspects, scheduling the communication may include scheduling the communication on the direct communication link by allocating a set of sidelink resources. In some aspects, the first controller PLC 1 may be configured as a small cell base station and scheduling the communication may include scheduling the communication on the direct communication link by allocating a set of access link resources.

In some aspects, scheduling the communication may include scheduling the communication on the indirect communication link by allocating a first set of resources corresponding to the direct communication link 910 between the IIoT device s3 and the second controller PLC 2 and allocating a second set of resources corresponding to the direct communication link 915 between the second controller PLC 2 and the first controller PLC 1. In some aspects, the first set of resources may include a set of sidelink resources, a set of access link resources, and/or the like. In some aspects, the second set of resources may include a set of sidelink resources. In some aspects, the set of sidelink resources may include at least one of a Mode 1 sidelink resource or a Mode 2 sidelink resource. The set of sidelink resources may be associated with a PC5 interface and the set of access link resources may be associated with an uplink/downlink (Uu) interface.

As shown by reference number 935, the scheduling network node s3 may transmit an indication of a resource allocation (RA) corresponding to the scheduled communication. The scheduling network node s3 may transmit the indication of the RA to the first controller PLC 1, the second controller PLC 2, the BS, and/or the like.

As indicated above, FIG. 9 is provided as an example. Other examples may differ from what is described with respect to FIG. 9.

Figure 10:
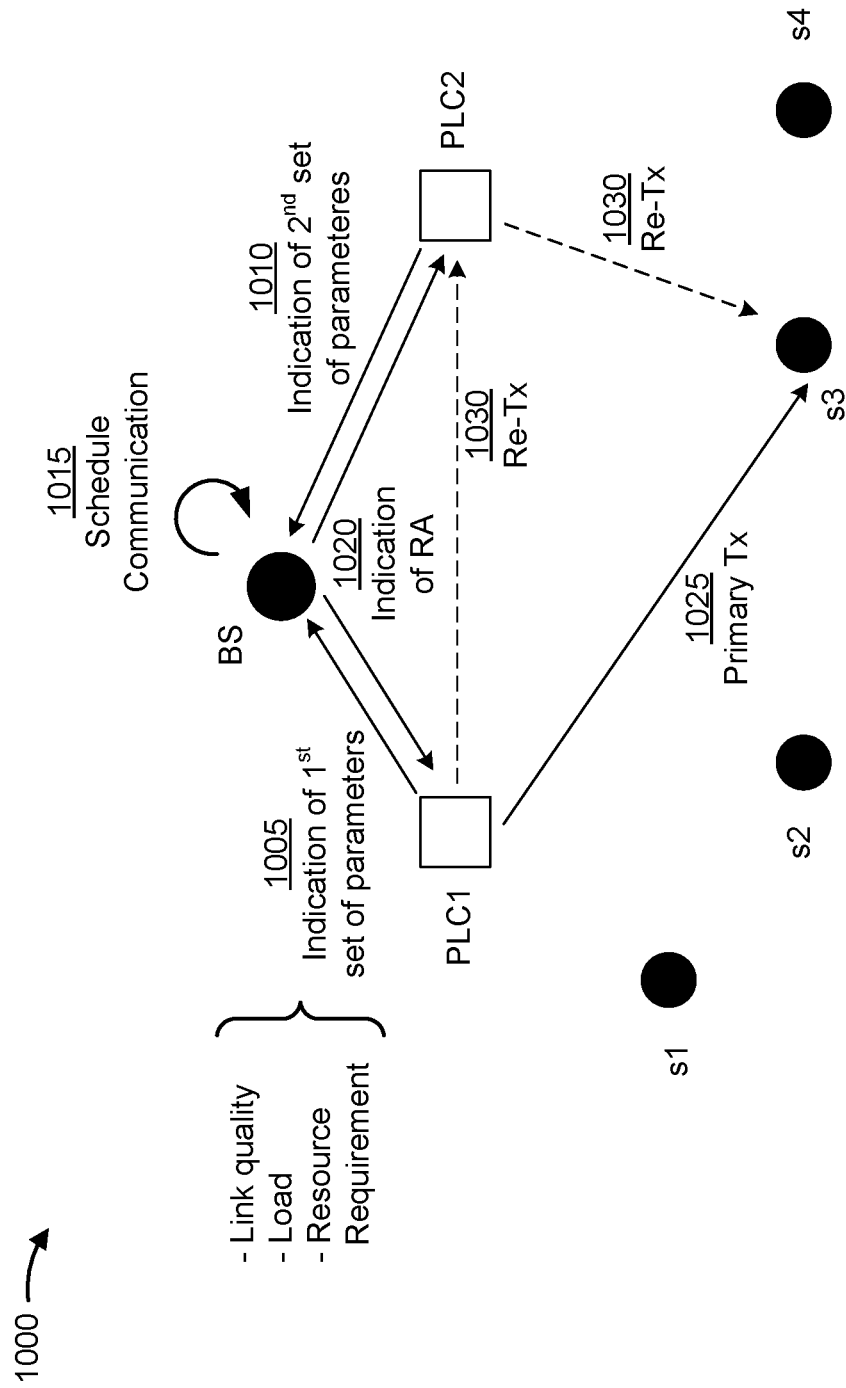

FIG. 10 is a diagram illustrating an example 1000 of communication link selection for non-RSRP based association in wireless industrial internet-of-things, in accordance with various aspects of the present disclosure.

As shown in FIG. 10, the BS may be the scheduling network node, in which case a direct communication link between s3 and PLC 1 and/or a direct communication link between s3 and PLC 2 may be based on Mode 1 sidelink. Similarly, a direct communication link between PLC 1 and PLC 2 may be based on Mode 1 sidelink. Direct communication links between the BS and either of the controllers PLC 1 or PLC 2, the IIoT devices s1-s4, and/or the like, may be based on access link communications and may utilize a Uu interface.

As shown by reference number 1005, the first controller PLC 1 may transmit, and the network node (shown as the BS) may receive, an indication of a first set of parameters that corresponds to a direct communication link between an IIoT device (shown as s3) and a first controller (shown as PLC 1). In some aspects, the first set of parameters may indicate a link quality associated with the direct communication link between the IIoT device s3 and the first controller PLC 1, a load associated with the first controller PLC 1, a resource requirement associated with the direct communication link between the IIoT device s3 and the first controller PLC 1, and/or the like.

As shown by reference number 1010, the second controller PLC 2 may transmit, and the BS may receive, an indication of a second set of parameters that corresponds to an indirect communication link between the IIoT device s3 and the first controller PLC 1 through the second controller PLC 2. In some aspects, the second set of parameters may include a set of first hop parameters corresponding to the direct communication link between the IIoT device s3 and the second controller PLC 2, a set of second hop parameters corresponding to the direct communication link between the second controller PLC 2 and the first controller PLC 1, and/or the like.

As shown by reference number 1015, the BS may schedule a communication on at least one of the direct communication link between the IIoT device s3 and the first controller PLC 1 or on the indirect communication link based at least in part on the first set of parameters and the second set of parameters. In some aspects, scheduling the communication may include determining a direct communication link metric based on the first set of parameters; determining an indirect communication link metric based on the second set of parameters; comparing the direct communication link metric with the indirect communication link metric; and selecting at least one of the direct communication link or the indirect communication link based at least in part on comparing the direct communication link metric with the indirect communication link metric.

As shown by reference number 1020, the BS may transmit an indication of a resource allocation (RA) corresponding to the scheduled communication. The BS may transmit the indication of the RA to the first controller PLC 1, the second controller PLC 2, the BS, and/or the like.

In some aspects, the scheduling network node (shown as the BS) may utilize multi-path diversity to improve reliability. For example, as shown by reference number 1025, scheduling the communication may include scheduling a primary transmission (shown as "Primary Tx") between the IIoT device and the first controller PLC 1 by allocating a first set of resources corresponding to the direct communication link. As shown by reference number 1030, the BS may schedule a retransmission (shown as "Re-Tx") between the IIoT device and the first controller PLC 1 by allocating a second set of resources corresponding to the indirect communication link. In some aspects, the retransmission may be sent upon receiving a negative acknowledgment (NACK) from the IIoT device s3. In some aspects, the primary transmission may be scheduled using resources corresponding to the indirect communication link and the retransmission may be scheduled using resources corresponding to the direct communication link.

As indicated above, FIG. 10 is provided as an example. Other examples may differ from what is described with respect to FIG. 10.

Figure 11:
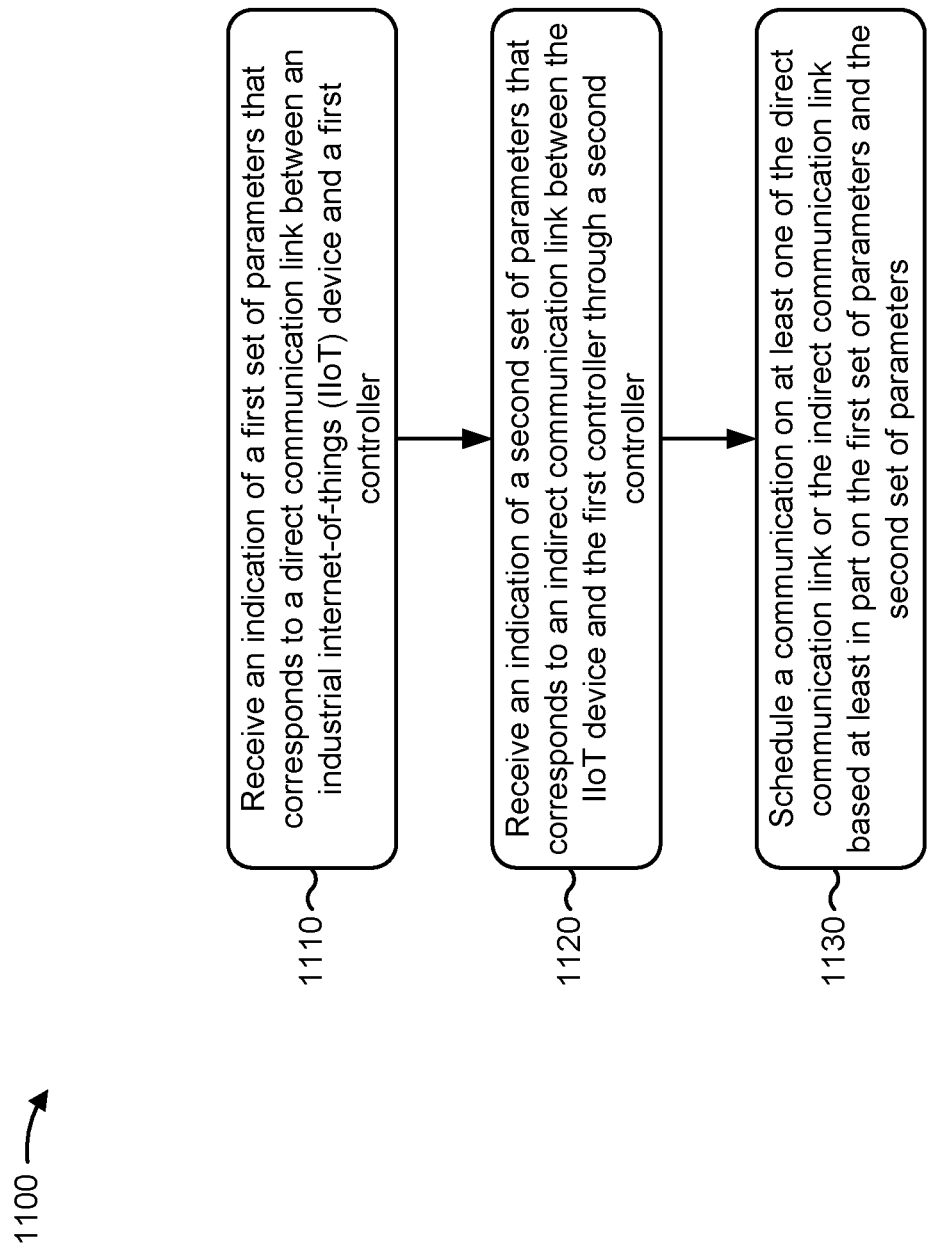
FIG. 11 is a diagram illustrating an example process performed, for example, by a network node, in accordance with various aspects of the present disclosure.

FIG. 11 is a diagram illustrating an example process 1100 performed, for example, by a network node, in accordance with various aspects of the present disclosure. Example process 1100 is an example where the network node (e.g., BS 110, UE 120, s1, s2, s3, s4, PLC 1, PLC 2, and/or the like) performs operations associated with communication link selection for non-RSRP based association in wireless industrial internet-of-things.

As shown in FIG. 11, in some aspects, process 1100 may include receiving an indication of a first set of parameters that corresponds to a direct communication link between an IIoT device and a first controller (block 1110). For example, the network node (e.g., using a receive processor, processor, memory, and/or the like) may receive an indication of a first set of parameters that corresponds to a direct communication link between an IIoT device and a first controller, as described above.

As further shown in FIG. 11, in some aspects, process 1100 may include receiving an indication of a second set of parameters that corresponds to an indirect communication link between the IIoT device and the first controller through a second controller (block 1120). For example, the network node (e.g., using controller/processor 280, memory 282, antenna 252, DEMOD 254, MIMO detector 256, receive processor 258, and/or the like) may receive an indication of a second set of parameters that corresponds to an indirect communication link between the IIoT device and the first controller through a second controller, as described above.

As further shown in FIG. 11, in some aspects, process 1100 may include scheduling a communication on at least one of the direct communication link or the indirect communication link based at least in part on the first set of parameters and the second set of parameters (block 1130). For example, the network node (e.g., using controller/processor 280, memory 282, and/or the like) may schedule a communication on at least one of the direct communication link or the indirect communication link based at least in part on the first set of parameters and the second set of parameters, as described above.

Process 1100 may include additional aspects, such as any single aspect or any combination of aspects described below and/or in connection with one or more other processes described elsewhere herein.

In a first aspect, the first set of parameters indicates at least one of: a link quality associated with the direct communication link between the IIoT device and the first controller, a load associated with the first controller, a resource requirement associated with the direct communication link between the IIoT device and the first controller, or a combination thereof.

In a second aspect, alone or in combination with the first aspect, the second set of parameters comprises at least one of a set of first hop parameters corresponding to a direct communication link between the IIoT device and the second controller, and a set of second hop parameters corresponding to a direct communication link between the second controller and the first controller.

In a third aspect, alone or in combination with one or more of the first and second aspects, the second set of parameters indicates at least one of: a link quality associated with a direct communication link between the IIoT device and the second controller, a load associated with the second controller, a resource requirement associated with the direct communication link between the IIoT device and the second controller, a link quality associated with a direct communication link between the second controller and the first controller, a load associated with the first controller, a resource requirement associated with the direct communication link between the second controller and the first controller, or a combination thereof.

In a fourth aspect, alone or in combination with one or more of the first through third aspects, scheduling the communication comprises: determining a direct communication link metric based on the first set of parameters; determining an indirect communication link metric based on the second set of parameters; comparing the direct communication link metric with the indirect communication link metric, and selecting at least one of the direct communication link or the indirect communication link based at least in part on comparing the direct communication link metric with the indirect communication link metric.

In a fifth aspect, alone or in combination with one or more of the first through fourth aspects, the direct communication link metric indicates at least one of: an estimated latency associated with the direct communication link between the IIoT device and the first controller, an estimated reliability associated with the direct communication link between the IIoT device and the first controller, or a combination thereof.

In a sixth aspect, alone or in combination with one or more of the first through fifth aspects, the indirect communication link metric indicates at least one of: an estimated latency associated with a direct communication link between the IIoT device and the second controller, an estimated reliability associated with the direct communication link between the IIoT device and the second controller, an estimated latency associated with a direct communication link between the second controller and the first controller, an estimated reliability associated with the direct communication link between the second controller and the first controller, or a combination thereof.

In a seventh aspect, alone or in combination with one or more of the first through sixth aspects, scheduling the communication on at least one of the direct communication link or the indirect communication link comprises: scheduling a primary transmission between the IIoT device and the first controller, and scheduling a retransmission between the IIoT device and the first controller.

In an eighth aspect, alone or in combination with one or more of the first through seventh aspects, scheduling the communication comprises: scheduling the primary transmission between the IIoT device and the first controller by allocating a first set of resources corresponding to one of the direct communication link or the indirect communication link, and scheduling the retransmission between the IIoT device and the first controller by allocating a second set of resources corresponding to the other one of the direct communication link or the indirect communication link.

In a ninth aspect, alone or in combination with one or more of the first through eighth aspects, scheduling the communication comprises: scheduling the primary transmission between the IIoT device and the first controller by allocating a first set of resources corresponding to the direct communication link or the indirect communication link, and scheduling the retransmission between the IIoT device and the first controller by allocating a second set of resources corresponding to the direct communication link or the indirect communication link.

In a tenth aspect, alone or in combination with one or more of the first through ninth aspects, scheduling the communication on at least one of the direct communication link or the indirect communication link comprises allocating a set of resources corresponding to the direct communication link, the indirect communication link, or a combination thereof.

In an eleventh aspect, alone or in combination with one or more of the first through tenth aspects, the set of resources comprises at least one of time resources, frequency resources, or spatial resources associated with at least one of: a semi-persistent scheduling communication, a periodic scheduling communication, an aperiodic scheduling communication, or a combination thereof.

In a twelfth aspect, alone or in combination with one or more of the first through eleventh aspects, scheduling the communication on at least one of the direct communication link or the indirect communication link comprises scheduling the communication on the direct communication link by allocating a set of sidelink resources.

In a thirteenth aspect, alone or in combination with one or more of the first through twelfth aspects, the first controller is configured as a small cell base station, and scheduling the communication on at least one of the direct communication link or the indirect communication link comprises scheduling the communication on the direct communication link by allocating a set of access link resources.

In a fourteenth aspect, alone or in combination with one or more of the first through thirteenth aspects, scheduling the communication on at least one of the direct communication link or the indirect communication link comprises scheduling the communication on the indirect communication link by: allocating a first set of resources corresponding to a direct communication link between the IIoT device and the second controller, and allocating a second set of resources corresponding to a direct communication link between the second controller and the first controller.

In a fifteenth aspect, alone or in combination with one or more of the first through fourteenth aspects, the first set of resources comprises at least one of a set of sidelink resources or a set of access link resources.

In a sixteenth aspect, alone or in combination with one or more of the first through fifteenth aspects, the second set of resources comprises a set of sidelink resources.

In a seventeenth aspect, alone or in combination with one or more of the first through sixteenth aspects, the set of sidelink resources comprises at least one of a Mode 1 sidelink resource or a Mode 2 sidelink resource.

In an eighteenth aspect, alone or in combination with one or more of the first through seventeenth aspects, the set of sidelink resources are associated with a PC5 interface.

In a nineteenth aspect, alone or in combination with one or more of the first through eighteenth aspects, the set of access link resources are associated with an uplink/downlink (Uu) interface.

In a twentieth aspect, alone or in combination with one or more of the first through nineteenth aspects, receiving the indication of the first set of parameters comprises at least one of: receiving a unicast message from the IIoT device, receiving a unicast message from the first controller, receiving a multicast message from the IIoT device, receiving a multicast message from the first controller, receiving a broadcast message from the IIoT device, receiving a broadcast message from the first controller, or a combination thereof.

In a twenty-first aspect, alone or in combination with one or more of the first through twentieth aspects, receiving the indication of the second set of parameters comprises at least one of: receiving a unicast message from the IIoT device, receiving a unicast message from the first controller, receiving a unicast message from the second controller, receiving a multicast message from the IIoT device, receiving a multicast message from the first controller, receiving a multicast message from the second controller, receiving a broadcast message from the IIoT device, receiving a broadcast message from the first controller, receiving a broadcast message from the second controller, or a combination thereof.

In a twenty-second aspect, alone or in combination with one or more of the first through twenty-first aspects, the network node is to periodically receive indications of at least one of the first set of parameters, the second set of parameters, or a combination thereof.

In a twenty-third aspect, alone or in combination with one or more of the first through twenty-second aspects, the network node comprises at least one of the IIoT device, the first controller, the second controller, a third controller, a base station, or a combination thereof.

In a twenty-fourth aspect, alone or in combination with one or more of the first through twenty-third aspects, the IIoT device comprises a sensor or an actuator.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The following provides an overview of some aspects of the present disclosure:

Aspect 1: A method of wireless communication performed by a network node, comprising: receiving an indication of a first set of parameters that corresponds to a direct communication link between an industrial internet-of-things (IIoT) device and a first controller; receiving an indication of a second set of parameters that corresponds to an indirect communication link between the IIoT device and the first controller through a second controller; and scheduling a communication on at least one of the direct communication link or the indirect communication link based at least in part on the first set of parameters and the second set of parameters.

Aspect 2: The method of aspect 1, wherein the first set of parameters indicates at least one of: a link quality associated with the direct communication link between the IIoT device and the first controller, a load associated with the first controller, a resource requirement associated with the direct communication link between the IIoT device and the first controller, or a combination thereof.

Aspect 3: The method of either of aspects 1 or 2, wherein the second set of parameters comprises at least one of a set of first hop parameters corresponding to a direct communication link between the IIoT device and the second controller, and a set of second hop parameters corresponding to a direct communication link between the second controller and the first controller.

Aspect 4: The method of any of aspects 1-3, wherein the second set of parameters indicates at least one of: a link quality associated with a direct communication link between the IIoT device and the second controller, a load associated with the second controller, a resource requirement associated with the direct communication link between the IIoT device and the second controller, a link quality associated with a direct communication link between the second controller and the first controller, a load associated with the first controller, a resource requirement associated with the direct communication link between the second controller and the first controller, or a combination thereof.

Aspect 5: The method of any of aspects 1-3, wherein scheduling the communication comprises: determining a direct communication link metric based on the first set of parameters; determining an indirect communication link metric based on the second set of parameters; comparing the direct communication link metric with the indirect communication link metric; and selecting at least one of the direct communication link or the indirect communication link based at least in part on comparing the direct communication link metric with the indirect communication link metric.

Aspect 6: The method of aspect 5, wherein the direct communication link metric indicates at least one of: an estimated latency associated with the direct communication link between the IIoT device and the first controller, an estimated reliability associated with the direct communication link between the IIoT device and the first controller, or a combination thereof.

Aspect 7: The method of either of aspects 5 or 6, wherein the indirect communication link metric indicates at least one of: an estimated latency associated with a direct communication link between the IIoT device and the second controller, an estimated reliability associated with the direct communication link between the IIoT device and the second controller, an estimated latency associated with a direct communication link between the second controller and the first controller, an estimated reliability associated with the direct communication link between the second controller and the first controller, or a combination thereof.

Aspect 8: The method of any of aspects 1-7, wherein scheduling the communication on at least one of the direct communication link or the indirect communication link comprises: scheduling a primary transmission between the IIoT device and the first controller; and scheduling a retransmission between the IIoT device and the first controller.

Aspect 9: The method of aspect 8, wherein scheduling the communication comprises: scheduling the primary transmission between the IIoT device and the first controller by allocating a first set of resources corresponding to one of the direct communication link or the indirect communication link; and scheduling the retransmission between the IIoT device and the first controller by allocating a second set of resources corresponding to the other one of the direct communication link or the indirect communication link.

Aspect 10: The method of aspect 8, wherein scheduling the communication comprises: scheduling the primary transmission between the IIoT device and the first controller by allocating a first set of resources corresponding to the direct communication link or the indirect communication link; and scheduling the retransmission between the IIoT device and the first controller by allocating a second set of resources corresponding to the direct communication link or the indirect communication link.

Aspect 11: The method of any of aspects 1-10, wherein scheduling the communication on at least one of the direct communication link or the indirect communication link comprises allocating a set of resources corresponding to the direct communication link, the indirect communication link, or a combination thereof.

Aspect 12: The method of aspect 11, wherein the set of resources comprises at least one of time resources, frequency resources, or spatial resources associated with at least one of: a semi-persistent scheduling communication, a periodic scheduling communication, an aperiodic scheduling communication, or a combination thereof.

Aspect 13: The method of any of aspects 1-12, wherein scheduling the communication on at least one of the direct communication link or the indirect communication link comprises scheduling the communication on the direct communication link by allocating a set of sidelink resources.

Aspect 14: The method of any of aspects 1-13, wherein the first controller is configured as a small cell base station, and wherein scheduling the communication on at least one of the direct communication link or the indirect communication link comprises scheduling the communication on the direct communication link by allocating a set of access link resources.

Aspect 15: The method of any of aspects 1-15, wherein scheduling the communication on at least one of the direct communication link or the indirect communication link comprises scheduling the communication on the indirect communication link by: allocating a first set of resources corresponding to a direct communication link between the IIoT device and the second controller; and allocating a second set of resources corresponding to a direct communication link between the second controller and the first controller.

Aspect 16: The method of aspect 15, wherein the first set of resources comprises at least one of a set of sidelink resources or a set of access link resources.

Aspect 17: The method of either of aspects 15 or 16, wherein the second set of resources comprises a set of sidelink resources.

Aspect 18: The method of aspect 17, wherein the set of sidelink resources comprises at least one of a Mode 1 sidelink resource or a Mode 2 sidelink resource.

Aspect 19: The method of either of aspects 17 or 18, wherein the set of sidelink resources are associated with a PC5 interface.

Aspect 20: The method of any of aspects 15-19, wherein the set of access link resources are associated with an uplink/downlink (Uu) interface.

Aspect 21: The method of any of aspects 1-20, wherein receiving the indication of the first set of parameters comprises at least one of: receiving a unicast message from the IIoT device, receiving a unicast message from the first controller, receiving a multicast message from the IIoT device, receiving a multicast message from the first controller, receiving a broadcast message from the IIoT device, receiving a broadcast message from the first controller, or a combination thereof.

Aspect 22: The method of any of aspects 1-21, wherein receiving the indication of the second set of parameters comprises at least one of: receiving a unicast message from the IIoT device, receiving a unicast message from the first controller, receiving a unicast message from the second controller, receiving a multicast message from the IIoT device, receiving a multicast message from the first controller, receiving a multicast message from the second controller, receiving a broadcast message from the IIoT device, receiving a broadcast message from the first controller, receiving a broadcast message from the second controller, or a combination thereof.

Aspect 23: The method of any of aspects 1-22, wherein the network node is to periodically receive indications of at least one of the first set of parameters, the second set of parameters, or a combination thereof.

Aspect 24: The method of any of aspects 1-23, wherein the network node comprises at least one of the IIoT device, the first controller, the second controller, a third controller, a base station, or a combination thereof.

Aspect 25: The method of any of aspects 1-24, wherein the IIoT device comprises a sensor or an actuator.

Aspect 26: An apparatus for wireless communication at a device, comprising a processor; memory coupled with the processor; and instructions stored in the memory and executable by the processor to cause the apparatus to perform the method of one or more aspects of aspects 1-25.

Aspect 27: A device for wireless communication, comprising a memory and one or more processors coupled to the memory, the memory and the one or more processors configured to perform the method of one or more aspects of aspects 1-25.

Aspect 28: An apparatus for wireless communication, comprising at least one means for performing the method of one or more aspects of aspects 1-25.

Aspect 29: A non-transitory computer-readable medium storing code for wireless communication, the code comprising instructions executable by a processor to perform the method of one or more aspects of aspects 1-25.

Aspect 30: A non-transitory computer-readable medium storing a set of instructions for wireless communication, the set of instructions comprising one or more instructions that, when executed by one or more processors of a device, cause the device to perform the method of one or more aspects of aspects 1-25.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software.

As used herein, satisfying a threshold may, depending on the context, refer to a value being greater than the threshold, greater than or equal to the threshold, less than the threshold, less than or equal to the threshold, equal to the threshold, and/or the like.

It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
   a memory; and
   one or more processors coupled to the memory, the one or more processors configured to:
      receive an indication of a first set of parameters that corresponds to a direct communication link between an industrial internet-of-things (IIoT) device that includes the network node and a first controller;
      receive an indication of a second set of parameters that corresponds to an indirect communication link between the IIoT device and the first controller through a second controller;
      schedule a communication on at least one of the direct communication link or the indirect communication link based at least in part on the first set of parameters and the second set of parameters; and transmit an indication of a resource allocation corresponding to the scheduled communication to at least one of the first controller or the second controller based at least in part on scheduling the communication on the at least one of the direct communication link or the indirect communication link.

2. The network node of claim 1, wherein the first set of parameters indicates at least one of:
a link quality associated with the direct communication link between the IIoT device and the first controller,
a load associated with the first controller,
a resource requirement associated with the direct communication link between the IIoT device and the first controller, or
a combination thereof.

3. The network node of claim 1, wherein the second set of parameters comprises at least one of a set of first hop parameters corresponding to a direct communication link between the IIoT device and the second controller, and a set of second hop parameters corresponding to a direct communication link between the second controller and the first controller.

4. The network node of claim 1, wherein the second set of parameters indicates at least one of:
a link quality associated with a direct communication link between the IIoT device and the second controller,
a load associated with the second controller,
a resource requirement associated with the direct communication link between the IIoT device and the second controller,
a link quality associated with a direct communication link between the second controller and the first controller,
a load associated with the first controller,
a resource requirement associated with the direct communication link between the second controller and the first controller, or
a combination thereof.

5. The network node of claim 1, wherein the one or more processors are configured to, when scheduling the communication:
determine a direct communication link metric based on the first set of parameters;
determine an indirect communication link metric based on the second set of parameters;
compare the direct communication link metric with the indirect communication link metric; and
select at least one of the direct communication link or the indirect communication link based at least in part on comparing the direct communication link metric with the indirect communication link metric.

6. The network node of claim 5, wherein the direct communication link metric indicates at least one of:
an estimated latency associated with the direct communication link between the IIoT device and the first controller,
an estimated reliability associated with the direct communication link between the IIoT device and the first controller, or
a combination thereof.

7. The network node of claim 5, wherein the indirect communication link metric indicates at least one of:
an estimated latency associated with a direct communication link between the IIoT device and the second controller,
an estimated reliability associated with the direct communication link between the IIoT device and the second controller, an estimated latency associated with a direct communication link between the second controller and the first controller,
an estimated reliability associated with the direct communication link between the second controller and the first controller, or
a combination thereof.

8. The network node of claim 1, wherein the one or more processors are configured to, when scheduling the communication on at least one of the direct communication link or the indirect communication link:
schedule a primary transmission between the IIoT device and the first controller by allocating a first set of resources corresponding to the direct communication link or the indirect communication link; and
schedule a retransmission between the IIoT device and the first controller by allocating a second set of resources corresponding to the direct communication link or the indirect communication link.

9. The network node of claim 1, wherein the one or more processors are configured to, when scheduling the communication on at least one of the direct communication link or the indirect communication link, allocate a set of resources corresponding to the direct communication link, the indirect communication link, or a combination thereof, and wherein the set of resources comprises at least one of time resources, frequency resources, or spatial resources associated with at least one of:
a semi-persistent scheduling communication,
a periodic scheduling communication,
an aperiodic scheduling communication, or
a combination thereof.

10. The network node of claim 1, wherein the one or more processors are configured to, when scheduling the communication on at least one of the direct communication link or the indirect communication link, schedule the communication on the direct communication link by allocating a set of sidelink resources.

11. The network node of claim 1, wherein the first controller is configured as a small cell base station, and wherein the one or more processors are configured to, when scheduling the communication on at least one of the direct communication link or the indirect communication link, schedule the communication on the direct communication link by allocating a set of access link resources.

12. The network node of claim 1, wherein the one or more processors are configured to, when scheduling the communication on at least one of the direct communication link or the indirect communication link, schedule the communication on the indirect communication link by:
allocating a first set of resources corresponding to a direct communication link between the IIoT device and the second controller; and
allocating a second set of resources corresponding to a direct communication link between the second controller and the first controller.

13. The network node of claim 12, wherein the first set of resources comprises at least one of a set of sidelink resources or a set of access link resources.

14. The network node of claim 12, wherein the second set of resources comprises a set of sidelink resources.

15. The network node of claim 1, wherein the one or more processors are configured to, when receiving the indication of the first set of parameters:
determine the first set of parameters,
receive a unicast message from the first controller,
receive a multicast message from the first controller, receive a broadcast message from the first controller, or a combination thereof.

16. The network node of claim 1, wherein the one or more processors are configured to, when receiving the indication of the second set of parameters:
receive a unicast message from the first controller,
receive a unicast message from the second controller,
receive a multicast message from the first controller,
receive a multicast message from the second controller,
receive a broadcast message from the first controller,
receive a broadcast message from the second controller, or
a combination thereof.

17. A method of wireless communication performed by a network node, comprising:
receiving an indication of a first set of parameters that corresponds to a direct communication link between an industrial internet-of-things (IIoT) device that includes the network node and a first controller;
receiving an indication of a second set of parameters that corresponds to an indirect communication link between the IIoT device and the first controller through a second controller;
scheduling a communication on at least one of the direct communication link or the indirect communication link based at least in part on the first set of parameters and the second set of parameters; and
transmitting an indication of a resource allocation corresponding to the scheduled communication to at least one of the first controller or the second controller based at least in part on scheduling the communication on the at least one of the direct communication link or the indirect communication link.

18. The method of claim 17, wherein the first set of parameters indicates at least one of:
a link quality associated with the direct communication link between the IIoT device and the first controller,
a load associated with the first controller,
a resource requirement associated with the direct communication link between the IIoT device and the first controller, or
a combination thereof.

19. The method of claim 17, wherein the second set of parameters comprises at least one of a set of first hop parameters corresponding to a direct communication link between the IIoT device and the second controller and a set of second hop parameters corresponding to a direct communication link between the second controller and the first controller.

20. The method of claim 17, wherein the second set of parameters indicates at least one of:
a link quality associated with a direct communication link between the IIoT device and the second controller,
a load associated with the second controller,
a resource requirement associated with the direct communication link between the IIoT device and the second controller,
a link quality associated with a direct communication link between the second controller and the first controller,
a load associated with the first controller,
a resource requirement associated with the direct communication link between the second controller and the first controller, or
a combination thereof.

21. The method of claim 17, wherein scheduling the communication comprises:
determining a direct communication link metric based on the first set of parameters;
determining an indirect communication link metric based on the second set of parameters;
comparing the direct communication link metric with the indirect communication link metric; and
selecting at least one of the direct communication link or the indirect communication link based at least in part on comparing the direct communication link metric with the indirect communication link metric.

22. The method of claim 21, wherein the direct communication link metric indicates at least one of:
an estimated latency associated with the direct communication link between the IIoT device and the first controller,
an estimated reliability associated with the direct communication link between the IIoT device and the first controller, or
a combination thereof.

23. The method of claim 21, wherein the indirect communication link metric indicates at least one of:
an estimated latency associated with a direct communication link between the IIoT device and the second controller,
an estimated reliability associated with the direct communication link between the IIoT device and the second controller,
an estimated latency associated with a direct communication link between the second controller and the first controller,
an estimated reliability associated with the direct communication link between the second controller and the first controller, or
a combination thereof.

24. The method of claim 17, wherein scheduling the communication on at least one of the direct communication link or the indirect communication link comprises:
scheduling a primary transmission between the IIoT device and the first controller; and
scheduling a retransmission between the IIoT device and the first controller.

25. The method of claim 24, wherein scheduling the communication comprises:
scheduling the primary transmission between the IIoT device and the first controller by allocating a first set of resources corresponding to one of the direct communication link or the indirect communication link; and
scheduling the retransmission between the IIoT device and the first controller by allocating a second set of resources corresponding to the other one of the direct communication link or the indirect communication link.

26. The method of claim 17, wherein scheduling the communication on at least one of the direct communication link or the indirect communication link comprises scheduling the communication on the direct communication link by allocating at least one of a set of sidelink resources or a set of access link resources.

27. The method of claim 17, further comprising periodically receiving indications of at least one of the first set of parameters, the second set of parameters, or a combination thereof.

28. A non-transitory computer-readable medium storing a set of instructions for wireless communication, the set of instructions comprising:

one or more instructions that, when executed by one or more processors of a network node, cause the network node to:
- receive an indication of a first set of parameters that corresponds to a direct communication link between an industrial internet-of-things (IIoT) device that includes the network node and a first controller;
- receive an indication of a second set of parameters that corresponds to an indirect communication link between the IIoT device and the first controller through a second controller;
- schedule a communication on at least one of the direct communication link or the indirect communication link based at least in part on the first set of parameters and the second set of parameters; and
- transmit an indication of a resource allocation corresponding to the scheduled communication to at least one of the first controller or the second controller based at least in part on scheduling the communication on the at least one of the direct communication link or the indirect communication link.

29. The non-transitory computer-readable medium of claim 28, wherein the direct communication link metric indicates at least one of:
- an estimated latency associated with the direct communication link between the IIoT device and the first controller,
- an estimated reliability associated with the direct communication link between the IIoT device and the first controller, or
- a combination thereof.

30. An apparatus for wireless communication, comprising:
- means for receiving an indication of a first set of parameters that corresponds to a direct communication link between an industrial internet-of-things (IIoT) device that includes the apparatus and a first controller;
- means for receiving an indication of a second set of parameters that corresponds to an indirect communication link between the IIoT device and the first controller through a second controller;
- means for scheduling a communication on at least one of the direct communication link or the indirect communication link based at least in part on the first set of parameters and the second set of parameters; and
- means for transmitting an indication of a resource allocation corresponding to the scheduled communication to at least one of the first controller or the second controller based at least in part on scheduling the communication on the at least one of the direct communication link or the indirect communication link.

* * * * *